Jan. 20, 1970

E. N. GIGANTE 3,490,822

ERECTING SET

Filed May 17, 1968

Inventor
ERNESTO NESOFSKY GIGANTE

By Michael S. Striker.
Attorney

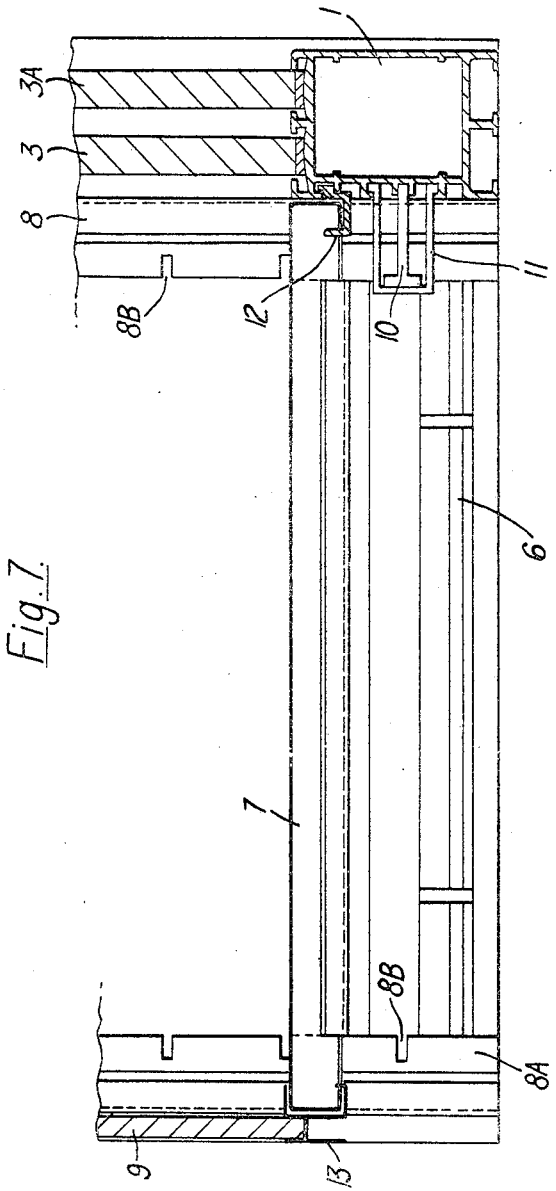

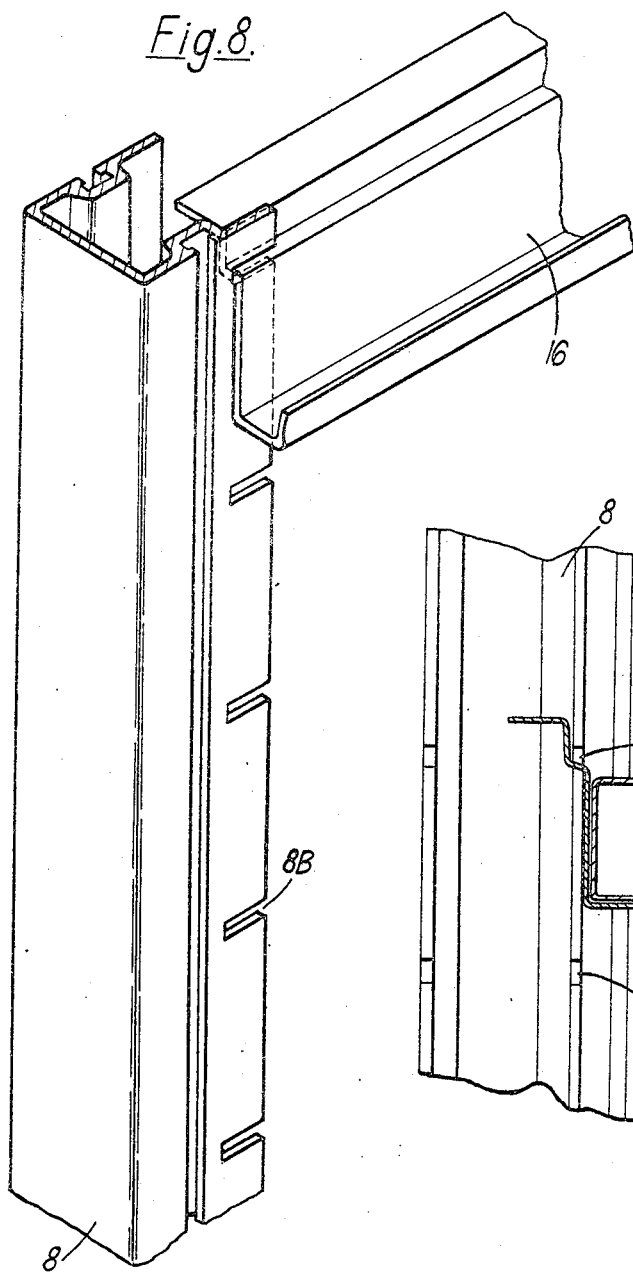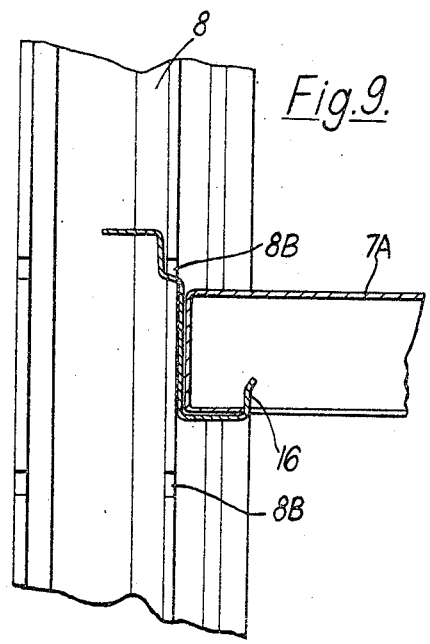

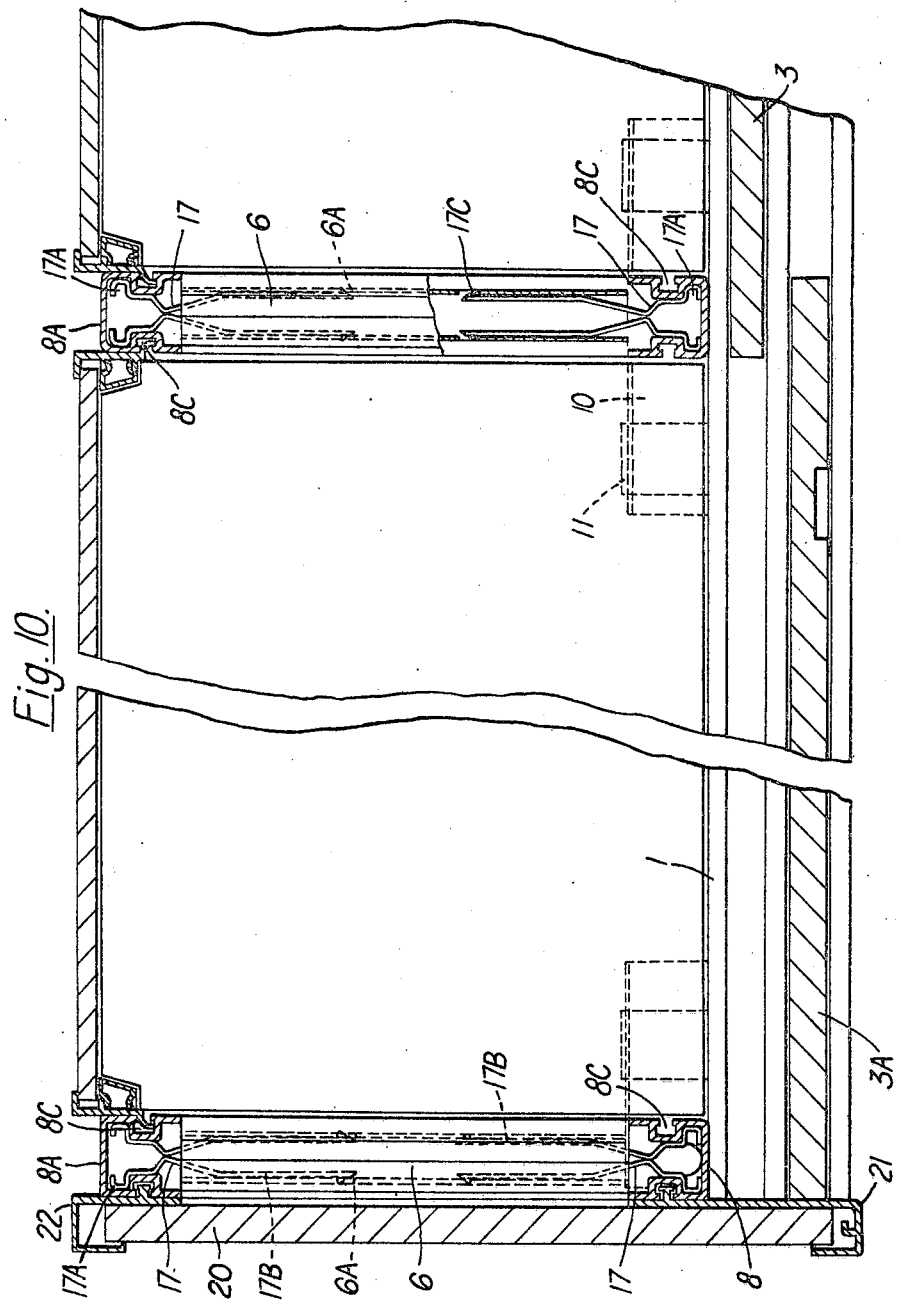

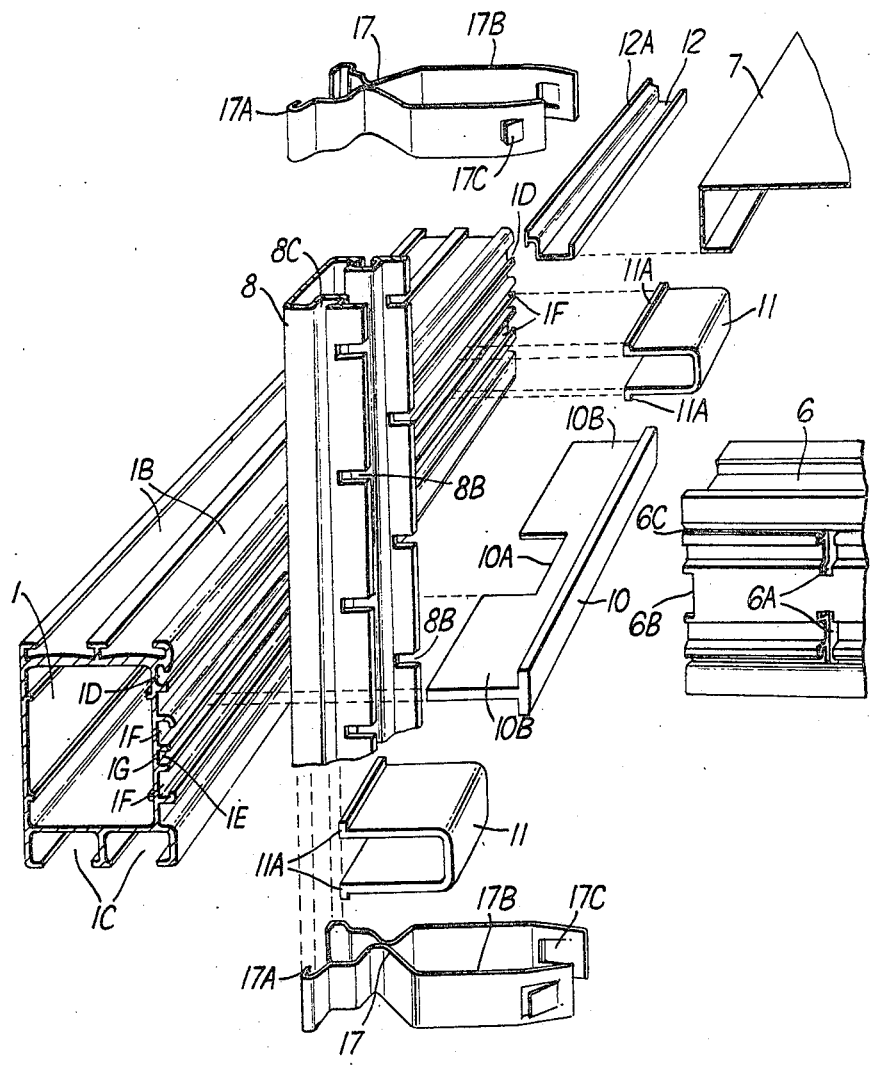

United States Patent Office 3,490,822
Patented Jan. 20, 1970

3,490,822
ERECTING SET
Ernesto Nesofsky Gigante, Alfonso Gomez 21–23,
Madrid, Spain
Filed May 17, 1968, Ser. No. 730,105
Claims priority, application Spain, May 19, 1967,
340,762
Int. Cl. A47b 47/00, 87/00, 53/00
U.S. Cl. 312—257                                    11 Claims

ABSTRACT OF THE DISCLOSURE

An erecting set for erecting a variety of pieces of furniture comprises elongated first support members serving as upright supports of a piece of furniture. Elongated second support members each adapted to connect two or more of the first support members. A plurality of T-bar members each having a web provided with longitudinally spaced cutouts so that such T-bar members can be placed against the uprights in parallelism with and on opposite sides of the uprights from respective second support members with the upright being received in one of the cut-outs and a free edge portion of the web extending into a groove provided in the respective second support member. Snap-type coupling members couple the respective T-bar members to the respective support members.

Background of the invention

The present invention relates to an erecting set in general, and particularly to an erecting set for erecting pieces of furniture and analogous articles. Still more specifically the invention relates to an improved erecting set of the type outlined with which pieces of furniture and analogous articles can be erected without resort to the use of screws, rivets, welds or other analogous connecting means.

In my Spanish Patent No. 334,373, I have described an erecting set with which it is possible to assemble various pieces of furniture and analogous articles. For a detailed description of this erecting set reference may be had to the aforementioned Spanish patent. For the purposes of the present disclosure it will suffice to point out that the erecting set there disclosed is characterized by the functional co-operation of uprights or posts of U-shaped cross-section which are joined by means of sheet-metal spacers the ends of which are inserted into slots provided in the posts at equidistant locations. The posts or uprights are thus maintained at the intended spacing from one another. Crossbars extend horizontally and are engaged with the front side of those posts located at the front of the respective furniture piece and serve to separate the laterally spaced sets of posts, each of which sets consists of a front and a rear post connected by the aforementioned spacers, as well as to subdivide the piece of furniture into the desired number of superimposed sections, if any. The crossbars each have an angular flange on the side facing the interior of the piece of furniture and this flange provides an open channel. The crossbars are further provided with two longitudinal channels in each of their upper and lower sides with the channels in the lower side having a greater depth than the ones in the upper one. The channels are adapted to guide the movement for instance of sliding doors. Metal shelves are engaged with their respective rear edges in a bar member having an upper channel and a lower one which latter receives upper edges of upright rear panels constituting the rear wall of the furniture piece. Upper bars are also provided and each have a channel capable of receiving and guiding either the upper edges of sliding doors or, if such upper bars are located at the rear of the piece of furniture, of receiving the upper edges of the upright panels constituting the rear wall of the piece. The upper bars are further provided with an upper flange facing the interior of the furniture piece and also with a vertical rib, both being adapted to be received in corresponding slots provided in the roof board of the furniture piece.

While the erecting set which I have thus briefly outlined, and which is disclosed in detail in my aforementioned Spanish Patent No. 334,737, has been found to be highly versatile and advantageous, experience has shown that it is capable of being still further improved in certain respects.

It is therefore the object of the present invention to provide such improvements.

A further object of the invention is to provide for an erecting set of the type here in question wherein all components may be connected with one another without resorting to the use of screws, rivets, welds or other analogous connecting means.

An additional object of the invention is to provide for such an erecting set wherein the connections may be effected in a most simple manner without, as pointed out before, the use of the aforementioned connecting means, but in such a fashion as to provide the completely assembled furniture or analogous piece with greater strength than that which is attainable by resorting to conventional connecting means.

Summary of the invention

An erecting set of the type in question comprises, in accordance with one feature of my invention, a plurality of elongated first support members each having a first and a second lateral side and constituting upright supports of a piece of furniture. A plurality of elongated second support members is provided each of which is adapted to be connected to spaced ones of the first support members in such a manner as to extend substantially horizontally between the same. The second support members each have a surface adapted to face the first lateral side of the associated first support members and being provided with longitudinally extending grooves. A plurality of T-bar members each have a web provided with a plurality of longitudinally spaced cut-outs, each T-bar member being adapted to extend in substantial parallelism with one of the second support members at the second lateral side of the associated first support member with the first support members with the latter each being located in one of the cut-outs and with the web projecting inermediate the cut-outs beyond the first sides of the first support members and into one of the grooves of the associated second support member. First snap-type coupling means couples the respective T-bar member to the associated first and second support members against relative movement. At least one elongated third support member is adapted to be connected to the respective first support members normal thereto and to the associated T-bar members and has an end portion provided with a recess so configurated as to straddle the respective T-bar member with which it is associated. Finally, second snap-type coupling means is associated with the respective first and third support members and is operative for connecting the same immovably to one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

FIG. 7 is a detail of the connection of the floor components of FIG. 2;

FIGS. 8 and 9 are details illustrating the coupling of secondary shelves with the uprights of the furniture piece;

FIG. 10 is a horizontal section on the line B—B of FIG. 1;

FIG. 11 illustrates the connection of horizontal crossbar members with the uprights;

Description of the preferred embodiments

Figure 1:
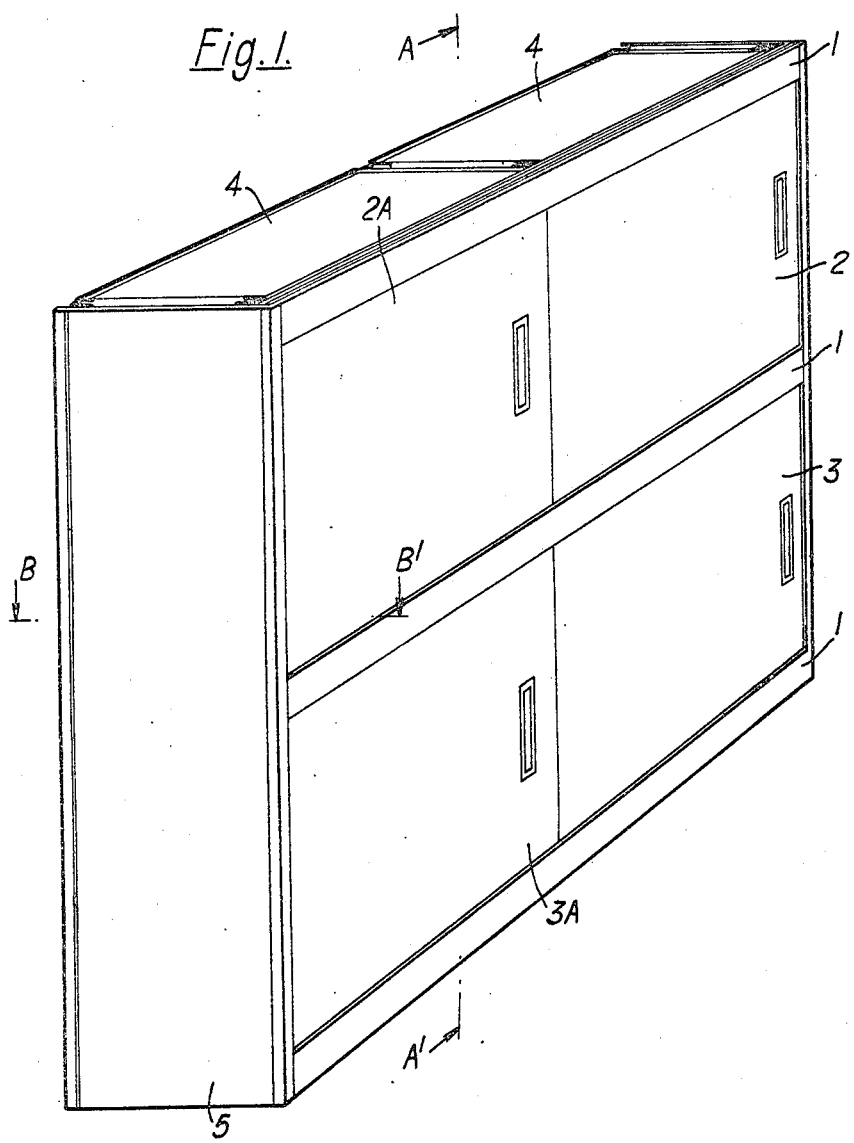
FIG. 1 is a perspective view of a piece of furniture assembled with the erecting set according to the present invention.

Discusing now the drawing in detail, and firstly FIG. 1 thereof, it will be seen that there is illustrated therein a piece of furniture assembled with the erecting set according to the present invention and consisting of two superimposed sections. Each of these sections in the illustrated embodiment is provided with sliding doors. Obviously, the article of furniture illustrated may be used by itself or it may be grouped with similar sections. As the drawing shows, it comprises three horizontal crossbars 1 which respectively are provided at the base, at the top and along the line of separation of the sections. Reference numerals 2 and 2A identify the sliding doors of one of the sections and reference numerals 3 and 3A identify the sliding doors of the other section. Reference numeral 4 identifies the roof board and 5 identifies the side panels of the furniture. Reference numeral 8 identifies corner posts or uprights.

Figure 2:
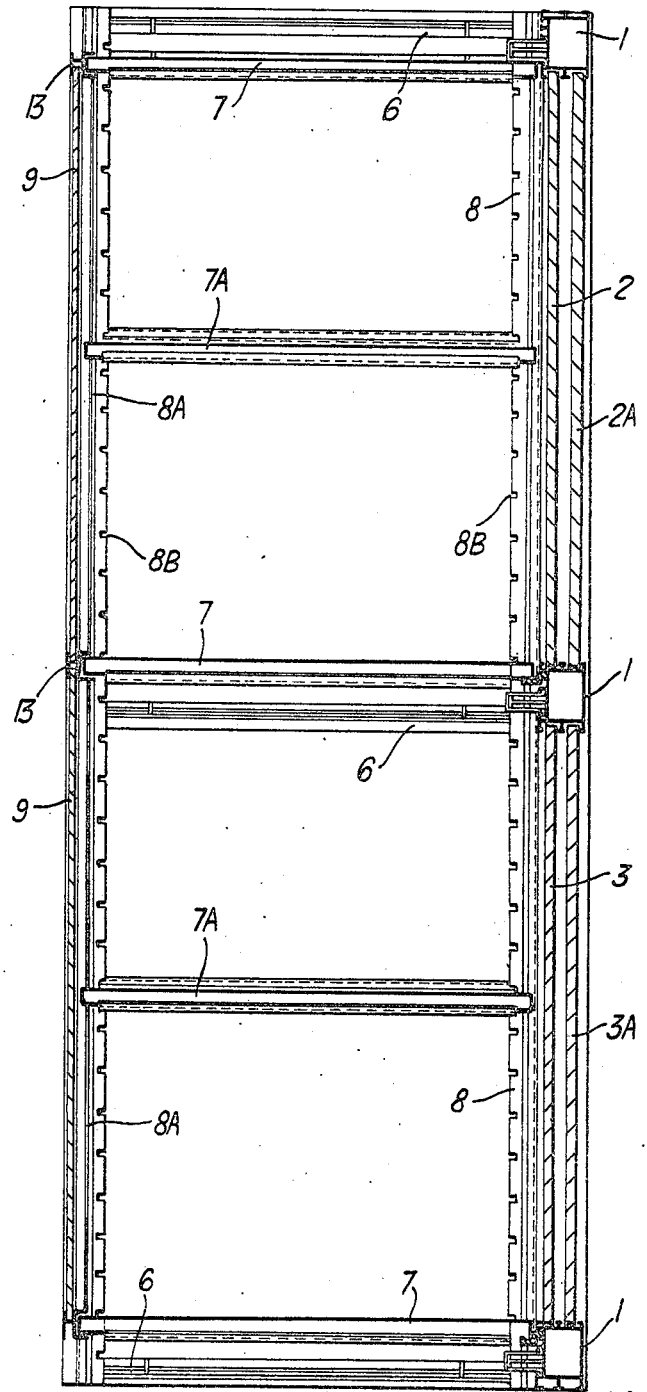
FIG. 2 is a vertical section taken on the line A—A of FIG. 1.

FIG. 2 is a section taken through FIG. 1 and it will be seen that the crossbars 1 are connected with the uprights 8, that spacers 6 extend between the uprights 8 which are respectively located at the front and rear side of the article of furniture, and that shelves 7 are located rearwardly of the crossbars 1. Shelves 7A are substantially similar to the shelves 7 but are adjustable and for this reason connected with the remaining components in a somewhat different manner that the shelves 7, as will be described subsequently.

The uprights 8 are of substantially U-shaped cross-section, and are thus constructed as profiled members. They are provided at the front of the furniture and those which are provided at the rear of the furniture, and which in their configuration and construction correspond to those at the front, are identified with reference numeral 8A. These uprights 8, 8A are all similar to one another and constitute the bearing members of the furniture piece because all of the remaining elements are supported thereby. For each modulus being constructed four of the uprights 8, 8A are provided which are located at the respective corners. If required because of the use to which the article assembled is to be put, or because of the dimensions or configuration of the article, additional ones of the uprights 8 or 8A may be provided intermediate the ones located at the respective corners. The horizontal crossbars 1 connect the respective uprights 8 and the respective uprights 8A, and the spacers 6 are each connected to one of the uprights 8 and to the associated upright 8A located rearwardly thereof. The rear wall of the article of furniture shown in FIG. 1 and in FIG. 2 is constituted by panels 9 which may be of any desired material.

Figure 3:
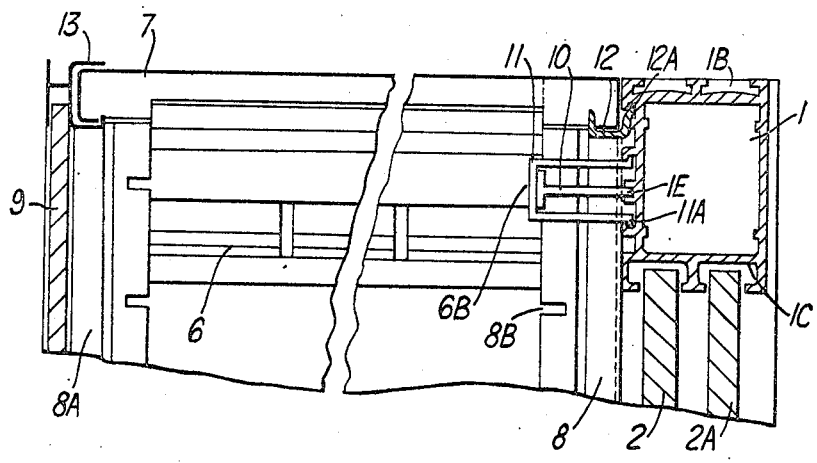
FIG. 3 is a detail view on an enlarged scale of the ceiling portion shown in FIG. 2.

FIG. 3 illustrates how the various components are connected if the piece of furniture is of such height, or is so located, that the roof board is not visible. In this case the front crossbar 1 is fitted to the uprights 8 by means of a T-bar member 10 and clamps 11 in the manner which will be described in more detail further below. A spacer 6, which is also constructed as a hollow profiled member just as the crossbars 1 and the uprights 8, 8A, is secured to the uprights 8, 8A in a manner which is also still to be described.

A shelf 7 constitutes in this assembly the roof board of the piece of furniture, and it engages with its front edge of the inner face of the crossbar 1, the front edge being received in a channel 12 provided on this inner face. The sides of the shelf 7 engage the spacers 6 and the rear edge of the shelf 7 supports a bar 13 which is pressure-fitted thereto and which is provided with two channels into which the edges of the respective rear panels 9 extend.

Figure 4:
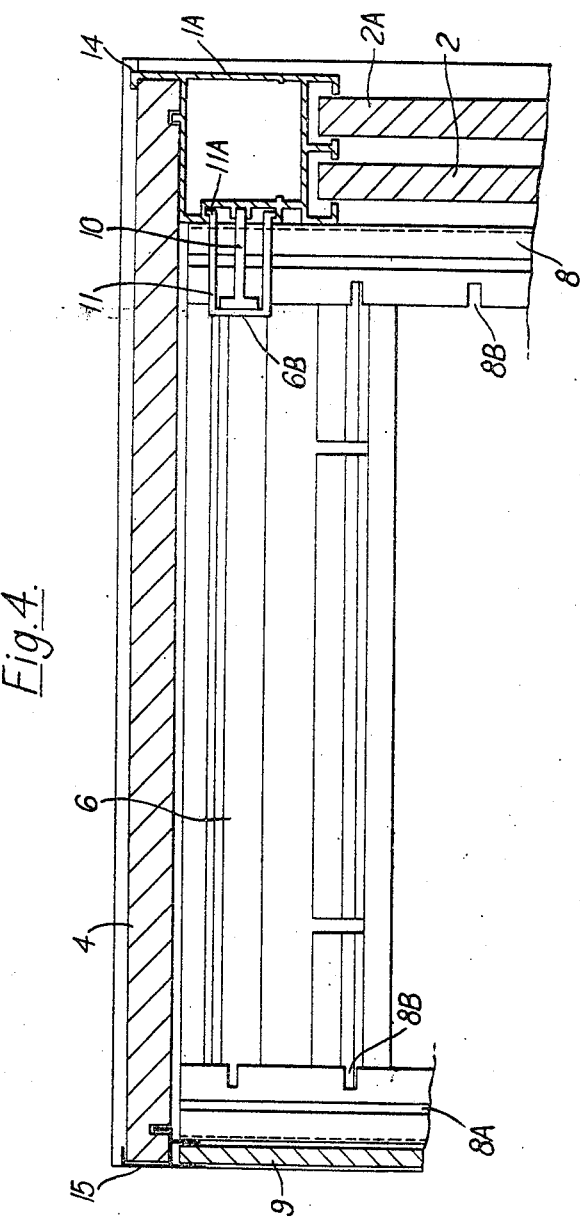
FIG. 4 is a detail view substantially similar to FIG. 3 but illustrating how the assembly is effected under circumstances where the upper boad or roof board may be seen, for instance in a relatively low furniture piece.

FIG. 4 illustrates the same connection if the furniture is of small height or is so positioned that its top is visible. In this case a roof board 4 is provided and the crossbar 1 is replaced with a crossbar identified with reference numeral 1A and having a flanged front facia extension 14 which receives the edge of the roof board 4. The bar 13 at the rear is replaced by a bar 15 corresponding to the crossbar 1A. In this assembly the facia extension 14 conceals the connection effectively.

Figure 5:
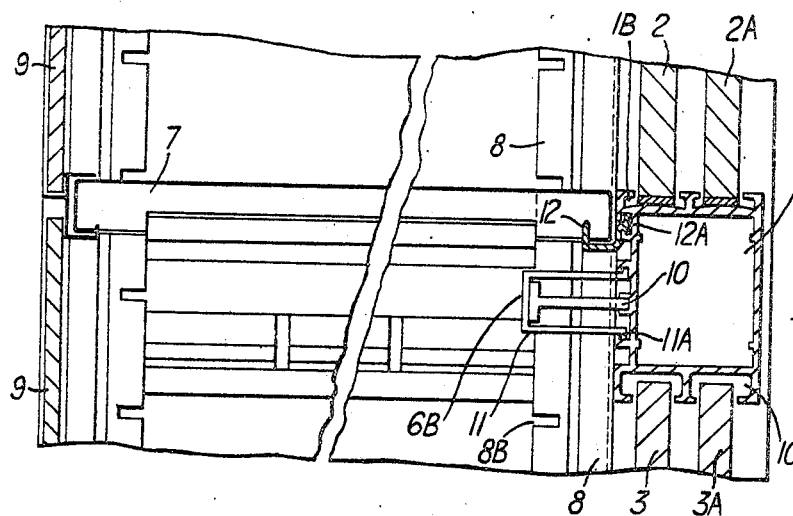
FIG. 5 is a detail of the middle part of FIG. 2.

FIG. 5 illustrates the connection between the upper and lower sections of the article of furniture shown in FIG. 1. In this instance the crossbar 1 has a double function because it constitutes not only the connection between the uprights 8 but also forms the guide for the two sets of sliding doors respectively identified with reference numerals 2, 2A and 3, 3A.

Figure 6:
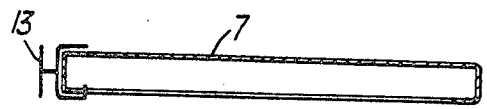
FIG. 6 shows a shelf in cross-section and FIG. 6a shows the same shelf in plan view.
Figure 6A:
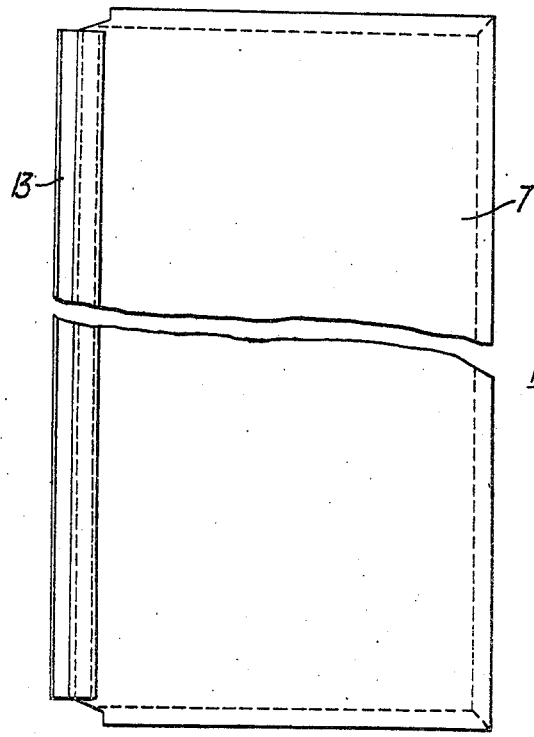

FIGS. 6 and 6a respectively show a cross-sectional and a plan view of a shelf 7 which is constructed as a shallow pan-like member having downwardly extending lateral portions. The rear bar 13 with its double channels 13a for the rear panels 9 is pressure-fitted onto the shelf 7.

FIG. 7 shows the base connection of the piece of furniture, and it will be seen that the lower crossbar 1 is connected with the uprights 8 in the same manner as discussed with respect to the top crossbar and the intermediate crossbar. Other than this, FIG. 7 is self-explanatory.

It will be noted that the auxiliary shelves 7A are movable and are supported only by their edges in channels provided by secondary bars 16 which are engaged within the slots 8B provided in the uprights 8 and 8A as shown in FIGS. 8 and 9. It should be noted that the term bar as utilized herein is intended to refer broadly to an elongated member without connotation as to cross-sectional configuration, so that this term includes any elongated member regardless of what cross-sectional outline and regardless of whether the member is of solid or hollow cross-section. These latter details are identified individually in the description of the various elements.

FIG. 10 is a horizontal section taken on the line B—B of FIG. 1. It will be seen that the uprights 8 and 8A, which are of substantially U-shaped cross-section, are provided with flanges having undercut grooves 8C of substantially T-shaped cross-section. This provides the interior space of the respective uprights in form of a double T-shape. Generally T-configurated members 17 each having a pair of shorter arms 17A and a pair of longer arms 17B connected as shown with one another, are coupled to the respective uprights. Specifically, the arms 17A are adapted to be received in the interior of the respective uprights 8, 8A as illustrated, while the longer arms 17B extend outwardly of the respective uprights 8, 8A and are pressure-fitted into the hollow ends of the hollow spaces 6. The arms 17B are provided at their free ends with projections 17C which are adapted to snap into cut-outs 6A provided in the spaces 6 so as to prevent undesired withdrawal of the latter from the arms 17B.

FIG. 8, which shows the horizontal crossbars 1 coupled with the uprights 8 and the connection of the spacers 6 therewith, illustrates that the horizontal crossbar 1 is provided in its upper side with two channels 1B and in its lower side with two channels 1C. The bottom walls of the channels 1B are somewhat convex to facilitate sliding movement of the sliding doors 2, 2A and 3, 3A. The lower channels 1C, which of course face downwardly when the crossbar 1 is in assembled condition with the remaining components of the set, have a depth which is somewhat greater than that of the channels 1B so as to permit the required play for the insertion of the sliding doors, it being known that the sliding doors are inserted in upward direction from below and are then allowed to descend again slightly.

The crossbar 1 is further provided with a longitudinally extending channel 1D of generally T-shaped cross-section which is adapted to receive the flange 12A having a complementary cross-section and provided on a secondary bar 12 which provides the channel for supporting the front edge portion of the shelf 7.

After the crossbar 1 has been placed against the rear side or bridge of an upright 8 at the desired height, one of the T-shaped bars 10 is applied from the opposite side against the same upright 8 in such a manner that the central cut-out 10A in the web of the bar 10 registers with the upright which latter is thus received in the cut-out 10A, and that the free edge of the web of the bar 10 engages in slots 8B. The web portions 10B, which straddle the upright 8, are received in the channel 1E provided in the crossbar 1. Clamps 11, which are of generally U-shaped cross-section as illustrated, can then be inserted into both sides of the upright 8 as also shown in the drawing. The flanges 11A of the clamps 11 are introduced in the corresponding channels 1F provided for this purpose in the crossbar 1 by deflecting the legs of the clamps 11 towards one another and releasing them once the flanges 11A are received in the respective channels 1F. This provides a tight and reliable connection between the crossbar 1 and the upright 8 which is not subject to accidental disconnection.

Figure 12:
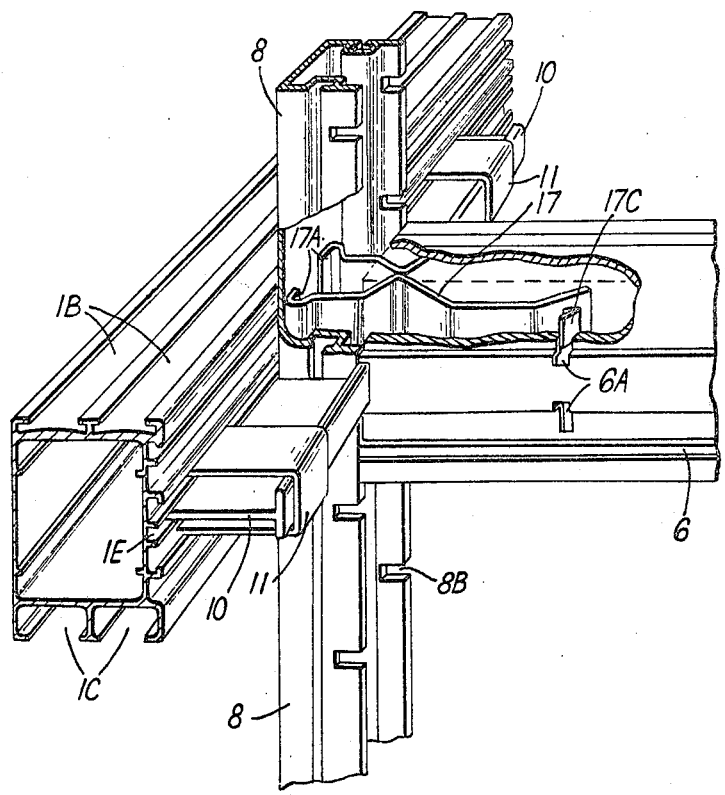
FIG. 12 shows the components of FIG. 11 in assembled condition.

To connect the spacer 6 the short arms 17A of the members 17 are inserted into the interior of the respective upright 8, one from above and another from below with respect to the T-shaped bar 10. The end portions of the spacers 6 which are being connected in this manner are then advanced against the long arms 17B of the members 17 until the long arms 17B enter into the interior of the spacers 6 and the projections 17C provided on the free ends of the long arms 17B snap into the cut-outs 6A in the spacers 6. At the same time, a recess 6B of the respective spacer 6 straddles the T-shaped bar 10. As shown in FIG. 12, the completed joint precludes any possibility of movement of any of the various components in whatever direction, and the components are thus connected together in a most stable and reliable manner without any need for resorting to the use of screws, rivets, welds or any other analogous means of connection. As also seen, longitudinal channels 6C are provided in the sides of the spacers 6 and these are adapted to be coupled with flanges 12A provided in the bars 12 for the purpose of providing lateral support for the shelves 7.

Figure 13:
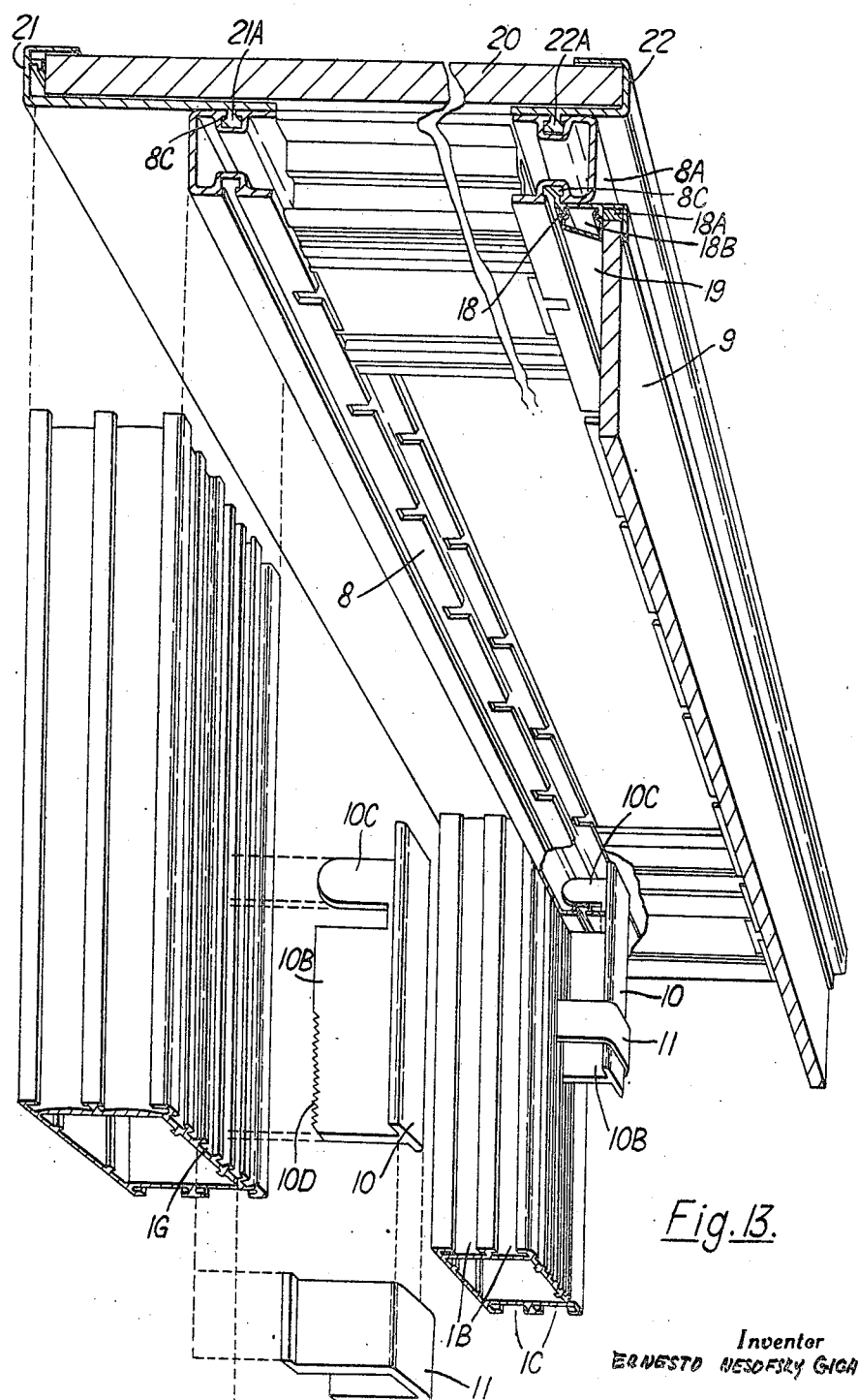
FIG. 13 is a view of the connection shown in FIG. 12 as seen from one side.

As shown in FIG. 13, connection in a somewhat different manner from what is shown in FIGS. 11 and 12, namely in the case where the joint or connection is not centered but rather located at one of the sides of the piece of furniture being assembled. In this case the T-bar member 10 is incised in its web at one end so as to form a tongue 10C, and the edge of the larger portion of the web is provided with a series of teeth 10D. The tongue 10C is introduced between the flanges of the associated upright 8 with the incision, or rather the recess provided by the presence of the incision, registering with the slot 8B as shown. Thereupon, the clamp 11 is inserted in the manner described before, causing the flange 10B of the bar 10 to bite with the teeth 10D thereof into a sharp ridge 1G provided at the bottom of the channel 1E.

The side panel constituting a side wall of the furniture piece is identified in FIG. 13 with reference numeral 20. It is located between two bars 21, 22 which are substantially similar but of different length. These are connected by means of respective T-shaped flanges 21A and 22A, which latter are inserted into outer grooves 8C provided on the respective uprights 8, 8A. The bar 21 projects outwardly so as to constitute a stop for movement of the sliding doors 2A and 3A as clearly shown in more detail in FIG. 10. The panels 9, which constitute the rear wall of the piece of furniture, are inserted with a respective edge portion into channels 18A provided in a bar 18 whose edge is in turn inserted into one of the grooves 8C provided on the respective uprights 8A. A second, parallel channel 18B is also provided in the bar 18 and a sealing strip 19 is received in the channel 18B and serves to seal the joint, holding the panel 9 against movement.

Figure 14:
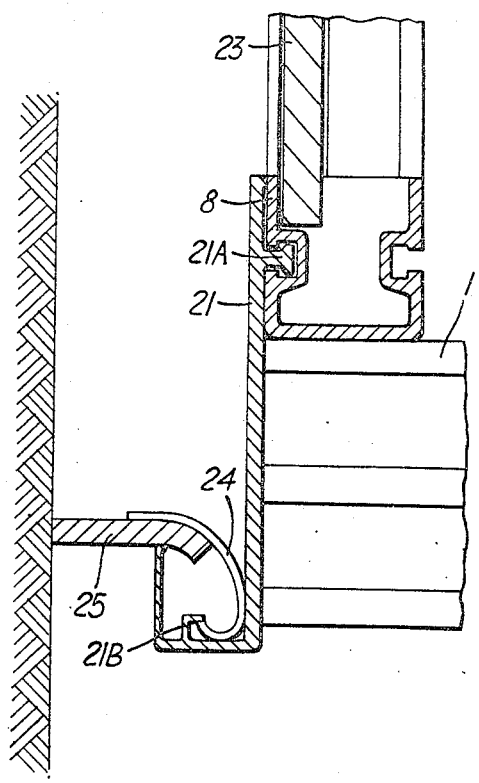
FIG. 14 is a cross-sectional detail view illustrating a modified assembly when the side of a piece of furniture constructed with the erecting set is concealed from view.

FIG. 14, finally, shows an assembly wherein one side wall of the piece of furniture is concealed from view, that is where the side of the furniture will be located close to a wall or other obstruction so that the side wall member 20 will not be required. In this case it suffices to arrange a panel 23 which is inserted into one of the flanges of the uprights 8, 8A. A sealing strip 25, which may consist of rubber or a similar material, is then provided which is held in position by a spring 24, as shown in FIG. 14 and which establishes a sealed joint between the side of the respective furniture piece and the wall of the room or against another piece of furniture.

It will be clear from what has been set forth above that by resorting to the present invention it is posible to assemble, from a set of standardized components which are of extremely simple construction, light in weight, high in strength and of uncluttered appearance, a plurality of pieces of furniture or analogous articles which may be assembled quickly, which may be disassembled just as quickly, and which may be re-assembled in different form. These pieces of furniture are aesthetically pleasing, they are strong and they are compact. Evidently, various modifications are possible in the set according to the present invention without departing from the spirit and the scope of the invention.

It will be understood that each of the elements described above, or two or more together, may also find a useful application in other types of erecting sets differing from the types described above.

While the invention has been illustrated and embodied in an erecting set which is particularly suitable for erecting articles of furniture and analogous articles, it is not intended to be limited to the details shown, since various modifications and structural changes may be made without departing in any way from the spirit of the present invention.

What is claimed is:

1. An erecting set, particularly for erecting a variety of pieces of furniture and analogous articles, comprising in combination in a plurality of elongated first support members each having a first and a second lateral side and constituting upright supports of a piece of furniture; a plurality of elongated second support members each adapted to be connected to spaced ones of said first support members extending substantially horizontally, said second support members each having a surface adapted to face said first lateral side of the respectively associated first support members and provided with longitudinally extending grooves; a plurality of T-bar members each having a web provided with a plurality of longitudinally spaced cut-outs, each T-bar member being adapted to extend in substantial parallelism with one of said second support members at the second lateral side of the associated first support members with the latter each being located in one of said cut-outs and said web projecting intermediate said cut-outs beyond said first side and into one of said grooves; first snap-type coupling means coupling the respective T-bar member to the associated first and second support members against movement relative thereto; at least one elongated third support member adapted to be connected to the respective first support members normal thereto and to the associated T-bar members and having an end portion provided with a recess configurated so as to straddle the respective T-bar member; and second snap-type coupling means associated with the respective first and third support members and operative for connecting the same immovably to one another.

2. An erecting set as defined in claim 1, wherein said first support members are U-shaped profiles and wherein said third members are of tubular configuration and provided with open ends, said second coupling means comprising a plurality of second coupling members each having two oppositely directed pairs of pincer-shaped arms one pair of which is adapted to be received and frictionally retained within one of said first support members and the other pair of which is adapted to project outwardly beyond the respective first support member and to be received and frictionally retained in an open end of a respective third support member.

3. An erecting set as defined in claim 2, said second coupling members being adapted to abut against a respectively associated T-bar member internally of the respective first support member.

4. An erecting set as defined in claim 3, said first coupling means comprising respective clamps of substantially U-shaped outline each adapted to straddle a T-bar member and having respective legs provided with free end portions adapted to extend into and be retained in respective ones of said grooves of an associated second support member.

5. An erecting set as defined in claim 2, said second pair of arms of the respective second coupling members having respective free end portions, and said third support members being provided with cut-outs inwardly of their respective open ends in which said free end portions are engaged with a snap action.

6. An erecting set as defined in claim 5; and further comprising a plurality of T-bar shaped connectors each having a web consisting of two sections of unequal length the shorter of which constitutes a tongue adapted to extend into the interior of a first support member, the longer one of said sections having a free edge portion provided with indentations and adapted to be received in one of said grooves of a second support member, said one groove being provided with a sharp ridge extending along its bottom and said free edge portion being adapted to bite into and be frictionally retained in contact with said sharp ridge.

7. An erecting set as defined in claim 6; and further comprising flanged profile members adapted to be operatively connected with some of said support members, said profile members being adapted to engage and retain shelves in predetermined position.

8. An erecting set as defined in claim 7; and further comprising a mounting bar for mounting rear wall panels and having a flage and two parallel channels, said flange joining the mounting bar to the respective first support member by its insertion into a longitudinal groove provided in the latter and one of said channels receiving the edge of a panel and the other receiving a sealing strip.

9. An erecting set as defined in claim 8; and further comprising a front crossbar member adapted for mounting a roof board of a piece of furniture and comprising a flange adapted to engage an edge portion of such roof board and a vertical projection adapted to be received in a slot provided on the underside of such roof board, and an additional crossbar similar to said front crossbar and provided with a channel adapted for receiving a rear edge of the roof board and for receiving an upper edge of a rear wall panel.

10. An erecting set as defined in claim 9; and further comprising side bars engaged in longitudinal grooves provided in said first support members and having flanges adapted to engage and support edge portions of side wall panels, the respective side wall panels and associated side bar projecting at the front side of an erected piece of furniture to an extent sufficient to constitute a stop for the movement of sliding doors.

11. An erecting set as defined in claim 10; and further comprising a sealing strip adapted to be received in a groove provided in one of said support members and to constitute a seal between the erected piece of furniture and an adjacent wall means, and a spring operative for maintaining said sealing strip in said groove.

References Cited

UNITED STATES PATENTS

| | | | |
|---|---|---|---|
| 3,150,903 | 9/1964 | Chapman et al. | 312—257 |
| 3,224,823 | 12/1965 | Schulze | 312—257 X |
| 3,353,888 | 11/1967 | Pritelli | 312—257 |
| 3,360,320 | 12/1967 | Lust | 312—257 |
| 3,393,031 | 7/1968 | Morrill | 312—257 X |

CASMIR A. NUNBERG, Primary Examiner

U.S. Cl. X.R.

312—199, 263